Figure 3:
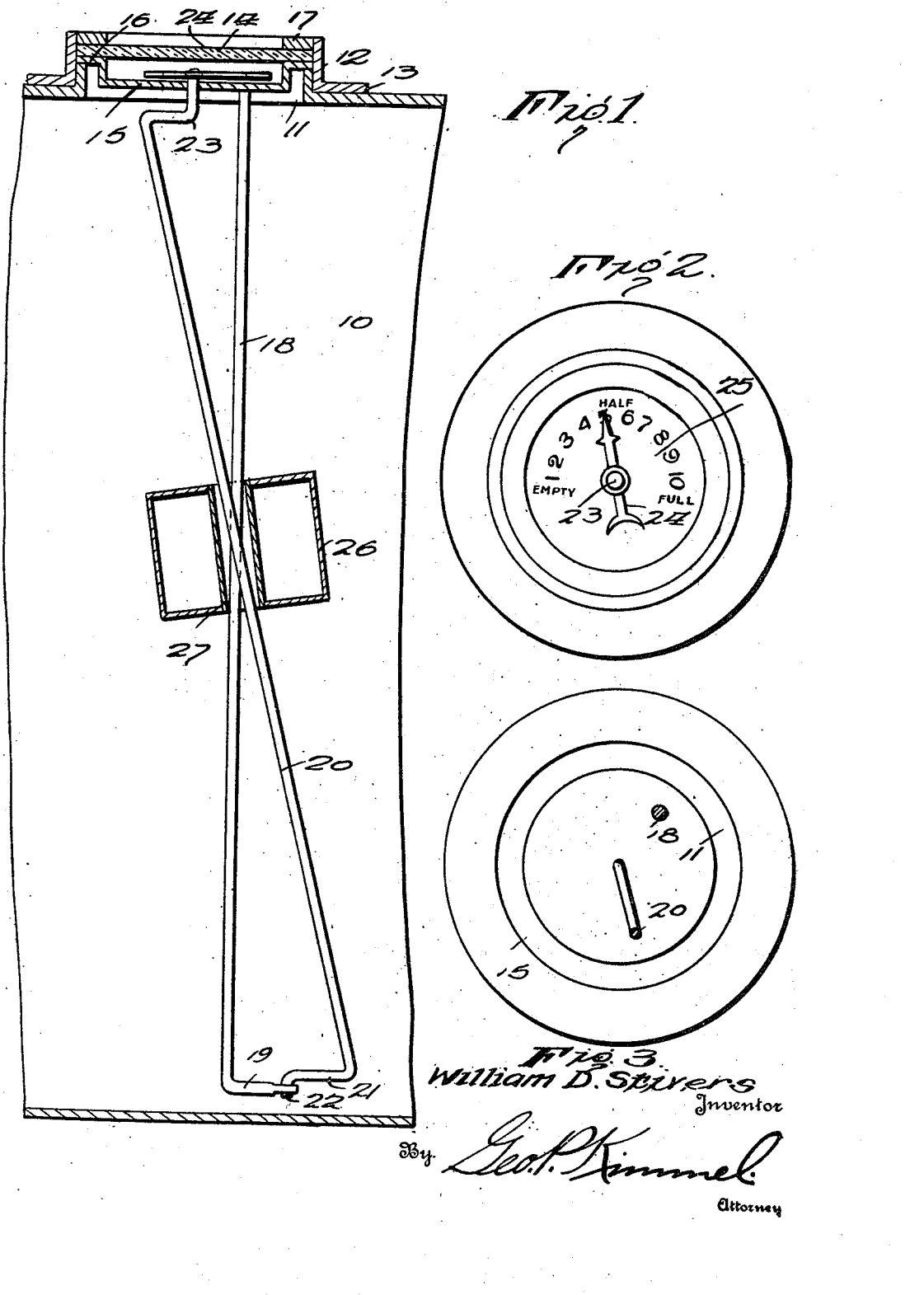

June 5, 1923.

W. D. STIVERS 1,457,471

AUTOMOBILE GASOLINE GAUGE

Filed July 12, 1918

William D. Stivers
Inventor

Patented June 5, 1923.

1,457,471

UNITED STATES PATENT OFFICE.

WILLIAM DAVID STIVERS, OF DETROIT, MICHIGAN, ASSIGNOR OF ONE-HALF TO GEORGE P. KIMMEL, OF WASHINGTON, DISTRICT OF COLUMBIA.

AUTOMOBILE GASOLINE GAUGE.

Application filed July 12, 1918. Serial No. 244,616.

*To all whom it may concern:*

Be it known that I, WILLIAM DAVID STIVERS, a citizen of the United States, and resident of Detroit, in the county of Wayne and State of Michigan, have invented certain new and useful Improvements in an Automobile Gasoline Gauge, of which the following is a specification.

This invention relates to gauges and more particularly to gauges for indicating liquid level.

The invention comprehends the provision of an improved gauge designed to be used for indicating liquid level, and particularly for use in connection with gasoline tanks or containers on automobiles, to indicate the amount of gasoline in the tank at all times thereby serving as a warning as to the condition of the supply.

With the above and other objects in view, as will appear as the description proceeds, the invention comprises the various novel features of construction and arrangement of parts which will be more fully described herein and set forth with particularity in the claims appended hereto.

Reference is had to the accompanying drawings forming a part of this application, in which like reference characters indicate the corresponding parts throughout the several views, in which—

Figure 1 is a fragmentary vertical sectional view of a tank equipped with my improved indicator, or gauge, Figure 2 is a plan view thereof, and Figure 3 is a horizonal sectional view taken below the dial plate, with the indicating mechanism removed from the tank and looking upwardly.

Referring to the drawings in detail, 10 indicates the tank adapted to contain liquid, such as an automobile tank designed to contain gasoline, the same having an opening 11 in its top portion over which is fitted a cover plate 12 through the medium of attaching flanges 13, the said plate or cap 12 having a transparent cover 14 to permit the gauge to be viewed therethrough.

The gauge further includes a bottom plate 15 in the form of a disk having a flanged upper portion 16 fitting beneath the transparent plate 14 and holding the latter in position in connection with the top flange 17 which is preferably in the form of a split ring. A vertical stem 18 is secured rigidly to the bottom portion 15 and depends therefrom, the lower end being formed with a horizontal portion 19 suitably apertured vertically at its free end.

The part 18 is the controlling stem, and cooperating therewith is an indicating stem 20 which like the part 18 is preferably formed of round stock. The stem 20 is diagonally or inclinedly positioned, and is formed on its lower end with a crank or arm 21 having a depending portion 22 pivotally engaged in the apertured free end of the horizontally bent end 19 at the foot of the stem 18. The stem 20 crosses the stem 18 and has its upper end formed with a crank portion 23 operating through the axial center of the circular dial forming body portion 15, the upper extremity thereof having an indicating arrow 24 fixed thereto as shown.

The stem 18 is disposed off center with respect to the dial 25, as shown in Figure 3, said dial being suitably marked to indicate the number of gallons in the tank or container. A float 26 preferably of hollow metal construction is provided with an axial aperture 27 receiving the stems 18 and 20 therethrough and this float will be buoyed up by the contents of the container or tank. When the float is at the bottom of the tank and it is empty, but when the parts will be positioned as shown in Figure 1 the tank is half full, the pointer indicating the volume of fluid in the tank. However, when the float rises by reason of the fluid in the tank, the upper portion of the stem 20 will be caused to rotate against the stem 18 while the lower portion separates therefrom, thus turning the indicating arrow to indicate the number of gallons, or when the tank is full.

It will thus be seen that I have provided a very simple and efficient form of gauge or indicating device for fluid containers and particularly adapted for automobile gasoline containers or tanks, to indicate the volume of gasoline therein. The device is simple in construction and will always indicate the amount of fuel in the tank. The device is also capable of economical production and will be strong and durable and efficient in use.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is.

1. A gauge of the class described comprising a combination with a dial, a stem supported off-center with respect to the dial, a pointer, said stem having an offset lower end, another stem crossing the first mentioned stem and having crank portions at the upper and lower ends thereof, said lower crank portion being pivotally engaged with the first named stem and the crank portion at the upper end of the second stem being axially engaged with the dial, a pointer fixed through said protruding end, and a float engaging around both stems at the point of crossing thereof.

2. A gasoline or fluid gauge, comprising a closure for a tank opening or the like, having a transparent cover, a dial within the closure, a stem depending from the dial and rigidly supported in a vertical position, said stem having its lower end formed with a horizontal apertured projection, another stem crossing the first named stem and having a crank portion at its lower end pivotally engaged with said horizontal portion and having a crank portion at its upper end rotatable axially in the dial, a pointer on the upper end of said last named crank portion, and a float having a vertical aperture receiving said stems, said float upon vertical movement causing the rotation of the second named stem whereby the opposite ends thereof will be caused to approach or separate from the first mentioned stem as and for the purpose specified.

3. In a liquid gauge, a pair of substantially straight guide rods slightly inclined relatively to each other, a float means slidably engaging both rods, means projecting laterally from the ends of said rods and pivoted together, whereby relative movement of the rods is permitted, and means associated with a pivot rigid with one of the rods for exhibiting visually the relative position of the rods.

4. In a liquid gauge, a pair of substantially straight guide rods slightly inclined relatively to each other, a float means apertured to receive both rods and slidable therealong, laterally projecting means carried by said rod and pivoted together upon an axis extending generally lengthwise of both rods whereby relative movement is permitted, and means associated with one of the rods for exhibiting visually the relative position of the rods.

5. In combination, a dial, a substantially L-shaped guide depending from said dial, a pointer movable over said dial, a movable member having crank end portions, one end portion being swivelled to the free end of said L-shaped guide and the other end portion operatively connected with said pointer to cause the same to traverse said dial, and a float movable on the guide and acting upon the movable member to transmit motion through the latter to said pointer.

6. The combination with a tank including a gauge dial, a guide rod depending from said dial within said tank, a member disposed in angular relation with respect to and pivotally engaged at its lower end with the free end of said guide rod and having an off-set at its upper end provided with a pivot passing through said dial, an indicating hand mounted on said pivot, and overlying the face of said dial, and a float slidably connected with said guide rod and said member whereby a movement of said float upon the guide rod will actuate the member as to indicate upon the dial the relative position of said float upon the guide rod.

7. A liquid lever gauge comprising a fixed indicating dial, an indicating element mounted for movement relative to said fixed indicating dial, a guide rod depending from the indicating dial, an actuating rod depending from said indicating element and having swinging connections with the lower end of said guide rod and said dial, and a buoyant element having connection with and movable along said rod and operating said actuating rod for the movement of said indicating element to any one of the several indicating points on said indicating dial and correspondingly with the travel of the buoyant element along said rods, the swivelled connections of said actuating rod being one out of alinement with respect to the other.

In testimony whereof, I affix my signature hereto.

WILLIAM DAVID STIVERS.